Figure 1:
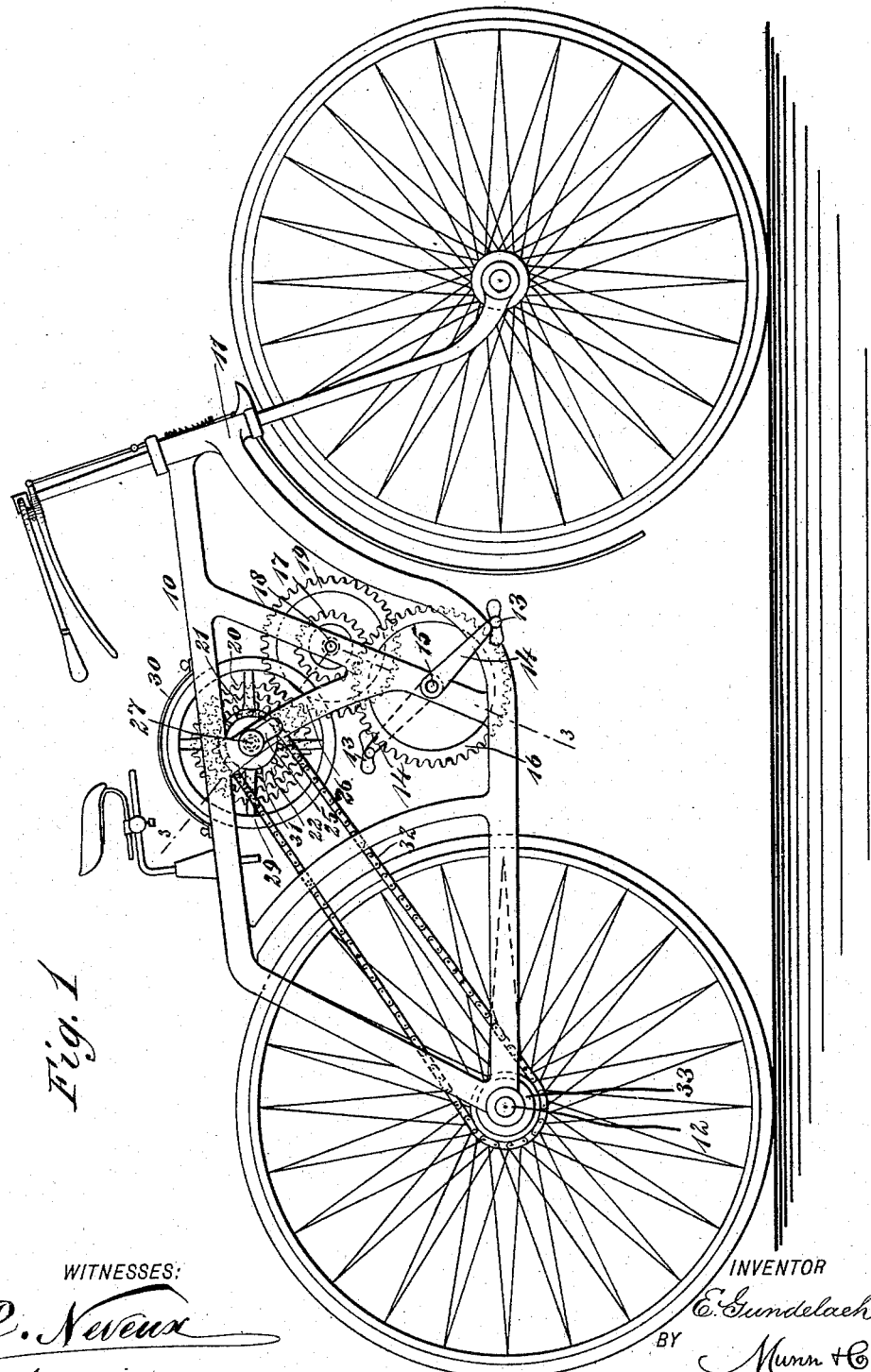

(No Model.) 2 Sheets—Sheet 1.

E. GUNDELACH.
BICYCLE GEAR.

No. 492,285. Patented Feb. 21, 1893.

WITNESSES:
C. Neveux
C. Sedgwick

INVENTOR
E. Gundelach
BY
Munn & Co
ATTORNEYS.

(No Model.)  2 Sheets—Sheet 2.
E. GUNDELACH.
BICYCLE GEAR.
No. 492,285.  Patented Feb. 21, 1893.
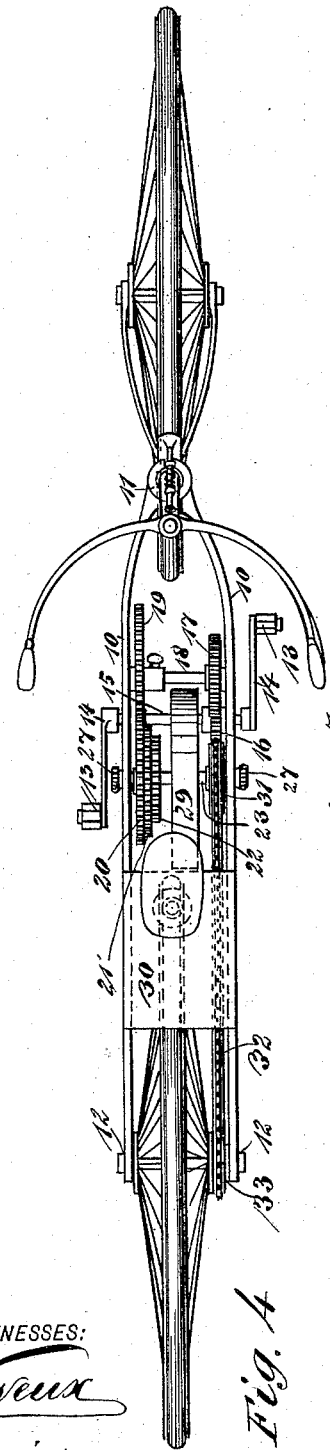
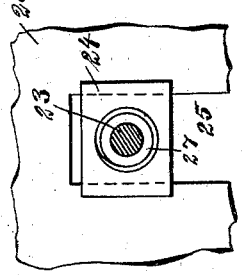
WITNESSES:
C. Neveux
C. Sedgwick
INVENTOR
E. Gundelach
BY Munn & Co.
ATTORNEYS

UNITED STATES PATENT OFFICE.

EMIL GUNDELACH, OF NEW YORK, N. Y.

BICYCLE-GEAR.

SPECIFICATION forming part of Letters Patent No. 492,285, dated February 21, 1893.

Application filed July 23, 1892. Serial No. 440,966. (No model.)

*To all whom it may concern:*

Be it known that I, EMIL GUNDELACH, of New York, in the county and State of New York, have invented a new and Improved Bicycle-Gear, of which the following is a full, clear, and exact description.

My invention relates to improvements in differential gears for bicycles, and especially for safety bicycles.

In practice it has been found that on good and level roads a machine may be geared so as to be driven much faster than machines usually are, and the object of my invention is to produce a convenient gear mechanism by means of which the machine may be speeded high on a good road, and may be changed to a low speed for hill climbing.

To this end my invention consists in certain features of construction and combinations of parts which will be hereinafter described and claimed.

Reference is to be had to the accompanying drawings forming a part of this specification, in which similar figures of reference indicate corresponding parts in all the views.

Figure 1 is a side elevation of a machine provided with my improved attachment; Fig. 2 is a plan of the same but with a portion of the frame part broken away; Fig. 3 is an enlarged detail section of the gear mechanism on the line 3—3 of Fig. 1; and Fig. 4 is an enlarged detail of the gear adjusting mechanism.

The bicycle is of the usual safety pattern and has an essentially diamond-shaped frame composed of the two side pieces 10, which converge at their front ends, where they are journaled to the fork, as shown at 11, in the usual way, and the side pieces of the frame are journaled at their rear ends to the rear axle of the machine, as shown at 12.

The machine has the usual treadles 13, the cranks 14 of which are secured to the transverse shaft 15, which is journaled in the lower portion of the main frame, and which shaft carries a gear wheel 16, which meshes with a smaller gear wheel 17 on a counter shaft 18, which is journaled upon the frame above the shaft 15. The shaft 18 also carries a gear wheel 19, larger than the gear wheel 17, and this is adapted to engage any of the toothed portions 20, 21, 22, of the stepped, or cone, gear, mounted on the adjustable shaft 23, which is supported above the shaft 18 and parallel with the shafts 18 and 15.

The power for driving the rear wheel of the machine is taken from the shaft 23, and it will be seen that this shaft will be turned with greater or less speed according as the portion 20, 21, or 22 of the cone gear is made to engage the gear wheel 19. To enable this arrangement to be successfully carried out, the gear wheel 19 is made laterally adjustable on its shaft 18 and held in place by a clamp screw 19ª.

The ends of the shaft 23 are carried by clamping devices or slides 24, which are adjustable up and down in the slots 25, which are produced in braces 26 of the main frame. The ends of the shaft 23 are journaled in thumb nuts 27, which are screwed into the slides 24, and as the slides have flanges overlapping the braces 26 it will be seen that the positions of the slides may be fixed by simply tightening the nuts.

The shaft 23 is provided with a fly-wheel 29 of sufficient depth to regulate and steady the movement of the shaft, and the fly-wheel and top portion of the frame are covered by a mud-guard 30, as is shown in Figs. 1 and 2. A sprocket wheel 31 is secured to the shaft 23, and this carries a chain 32 which connects with a sprocket wheel 33 on the rear bicycle wheel in the usual way. It will be seen that by turning the crank shaft 15, by means of the treadles 13, the movement will be transmitted to the gear wheels 16, 17, 19 and stepped, or cone, gear, and thus to the shaft 23, and from said shaft to the rear bicycle wheel, and as the gear mechanism is a speed multiplying mechanism the rear bicycle wheel will be made to revolve several times at every revolution of the crank shaft, and consequently the machine may be driven with great speed.

As shown in the drawings, and especially in Fig. 3, the gear mechanism is adapted to drive the machine at top speed, but if the roads are bad and the machine is to be driven slowly, but with greater power, the shaft 23 is lowered in the slots 25 and adjusted by the thumb nuts 27, and so that the gear wheel, 19, may mesh either with the portion 21, or 22, of the cone gear as desired.

From the above description it will be seen that the gear mechanism may be easily adjusted so as to regulate the speed and power, and that a convenient arrangement is provided for multiplying the speed.

Having thus fully described my invention, I claim as new and desire to secure by Letters Patent—

1. The combination, with a bicycle, having a suitable frame, of a crank-shaft journaled in the frame, a counter-shaft geared to the crank shaft, a gear which is laterally adjustable on the counter-shaft, a third shaft which is geared with one of the bicycle wheels and adjustable toward and from the counter-shaft, and a cone, or stepped, gear mounted on such third shaft, substantially as described.

2. The combination, with a bicycle, having a frame with parallel side pieces, of a pedal-operated crank-shaft journaled in the frame, a counter-shaft journaled parallel with such crank shaft and geared therewith, a gear which is laterally adjustable on the counter-shaft, a third shaft arranged parallel with the latter and adjustable toward and from the same, a cone gear mounted on such third shaft, a fly wheel carried by the latter, and an operative driving connection between the third shaft and one of the bicycle wheels, substantially as described.

3. In a bicycle, the combination, with a frame journaled on the bicycle wheels and provided with parallel slots in its opposite sides, of a pedal-operated crank-shaft journaled in the frame, a counter-shaft similarly journaled in the frame and geared with said crank-shaft, a gear which is laterally adjustable on such counter-shaft, a third shaft having its ends journaled in slides which move in the slots of the frame, clamping devices for securing said slides in position, a cone gear mounted on the third shaft, and an operative gear-connection between such adjustable shaft and one of the bicycle wheels, substantially as described.

EMIL GUNDELACH.

Witnesses:
WARREN B. HUTCHINSON,
C. SEDGWICK.